(12) United States Patent
Hefiana

(10) Patent No.: US 11,630,568 B2
(45) Date of Patent: Apr. 18, 2023

(54) DEVICE FOR A DIGITAL WRITING INSTRUMENT

(71) Applicant: NANOGA SA, Lausanne (CH)

(72) Inventor: Nasser Hefiana, Lausanne (CH)

(73) Assignee: Nanoga SA, Lausanne (CH)

(*) Notice: Subject to any disclaimer, the term of this patent is extended or adjusted under 35 U.S.C. 154(b) by 65 days.

(21) Appl. No.: 16/759,785

(22) PCT Filed: Oct. 29, 2018

(86) PCT No.: PCT/IB2018/058448
§ 371 (c)(1),
(2) Date: Apr. 29, 2020

(87) PCT Pub. No.: WO2019/087038
PCT Pub. Date: May 9, 2019

(65) Prior Publication Data
US 2021/0149557 A1  May 20, 2021

(30) Foreign Application Priority Data

Oct. 30, 2017  (CH) .................. CH01307/17

(51) Int. Cl.
*G06F 3/04883*  (2022.01)
*G06F 3/03*  (2006.01)
(Continued)

(52) U.S. Cl.
CPC ........ *G06F 3/04883* (2013.01); *G06F 3/0317* (2013.01); *G06F 3/0383* (2013.01); *G06F 3/03545* (2013.01); *G06K 19/06046* (2013.01)

(58) Field of Classification Search
CPC ............... G06F 3/04883; G06F 3/0317; G06F 3/03545; G06F 3/0383; G06K 19/06046
See application file for complete search history.

(56) References Cited

U.S. PATENT DOCUMENTS

| 7,292,198 B2 | 11/2007 | Shtrom et al. |
| 9,019,165 B2 | 4/2015 | Shtrom et al. |
| (Continued) | | |

FOREIGN PATENT DOCUMENTS

| JP | 2007/245526 A | 9/2007 |
| JP | 2013/532860 A | 8/2013 |
| (Continued) | | |

OTHER PUBLICATIONS

International Search Report and Written Opinion for PCT/IB2018/058488, dated Feb. 1, 2019, 14 pages.

*Primary Examiner* — Ariel A Balaoing
(74) *Attorney, Agent, or Firm* — Blank Rome LLP

(57) ABSTRACT

The invention concerns device for a digital writing instrument the device comprising a substrate with a transparent or translucent layer and a pattern layer on the transparent layer. The pattern comprising an active area made with photoluminescent material and an inactive area made with non photoluminescent material. The photoluminescent material comprises a successive alternate of a first layer and a second layer generating photoluminescent structure at the interface of said first layer and said second layer, the pattern layer comprises a series of N points distributed in a plan (X,Y), either said N-points define the active area whereas the inactive area is defined by the area between said N points. The N-points defines the inactive area whereas the active area is defined by the area between said N points. The invention also relates to a method for determining a position, a method for manufacturing, a system and a stylus.

21 Claims, 7 Drawing Sheets

(51) Int. Cl.
  *G06F 3/0354* (2013.01)
  *G06F 3/038* (2013.01)
  *G06K 19/06* (2006.01)

(56) References Cited

U.S. PATENT DOCUMENTS

| | | | |
|---|---|---|---|
| 9,837,711 | B2 | 12/2017 | Shtrom et al. |
| 10,752,043 | B2 | 8/2020 | Hefyene et al. |
| 10,753,745 | B2 | 8/2020 | Townsend et al. |
| 10,753,746 | B2 | 8/2020 | Geaghan et al. |
| 11,566,648 | B2 | 1/2023 | Yokotani |
| 2008/0246388 | A1* | 10/2008 | Cheon .................. G02F 2/02 313/501 |
| 2009/0286342 | A1* | 11/2009 | Takahashi ............ H01L 33/007 438/32 |
| 2011/0115750 | A1* | 5/2011 | Ebner .................. G06F 3/0386 178/18.09 |
| 2012/0068450 | A1 | 3/2012 | Douglas et al. |
| 2013/0153787 | A1* | 6/2013 | Geaghan ............ G06V 30/1423 250/206.1 |
| 2013/0314313 | A1 | 11/2013 | Ericson et al. |
| 2014/0168089 | A1* | 6/2014 | Geaghan ............. G06F 3/03542 345/173 |
| 2015/0002399 | A1* | 1/2015 | Tang .................... G06F 3/03545 345/173 |
| 2017/0068450 | A1 | 3/2017 | Candelaria et al. |
| 2017/0081754 | A1* | 3/2017 | Hayakawa ............. G06F 3/041 |
| 2017/0212610 | A1* | 7/2017 | Thomas ............... G02B 5/0242 |
| 2018/0257421 | A1* | 9/2018 | Hefyene ................ C09K 11/64 |
| 2019/0080127 | A1 | 3/2019 | Kenji |

FOREIGN PATENT DOCUMENTS

| | | |
|---|---|---|
| JP | 2015/533953 A | 11/2015 |
| JP | 60-31689 B1 | 11/2016 |
| JP | 2017/064449 A | 4/2017 |
| JP | 2017/089857 A | 5/2017 |
| JP | 2019/501035 A | 1/2019 |
| TW | I-384686 B | 2/2013 |
| TW | 2014/33946 A | 9/2014 |
| WO | WO-2006/065380 A1 | 6/2006 |
| WO | WO-2013/090494 A1 | 6/2013 |
| WO | WO-2017/089857 A1 | 6/2017 |

* cited by examiner

DEVICE FOR A DIGITAL WRITING INSTRUMENT

RELATED APPLICATIONS

This application is a national phase of PCT/IB2018/058448, filed on Oct. 29, 2018, which claims the benefit of Switzerland Application No. CH01307/17, filed on Oct. 30, 2017. The entire contents of those applications are hereby incorporated by reference.

FIELD OF THE INVENTION

The present invention concerns a device for a digital writing instrument, a stylus design for being used with said device, a method for manufacturing said device and a method for determining the position of a stylus on a surface of said device. The invention also relates to a system for a digital writing technology.

DESCRIPTION OF RELATED ART

Enabling hand script digitalization in existing smartphones, tablets and notebook requires the use of the multiscreen feature which is fully dependent on device battery. Activating the hand script digitalization causes a rise in battery consumption and consequently induces:

Shortage in the device autonomy;
Shortage in the life of the battery;
Potential hazards of the battery overheating The larger the screen size, the more energy is consumed, the faster the battery power is depleted. Currently, very few mobile devices propose hand script digitalization, such as Samsung Note 9, Apple IPad pro. and Microsoft Surface Pro. Using more robust/powerful batteries and reinforcing the hardware design to prevent device damage from excessive battery overheating would add cost by 20~30%.

Generally, hand script digitalization technologies require a stylus that is displaced on the screen of the electronic device. The screen comprises means for determining the position of the stylus while said stylus is displacing on the screen. Various technologies have been developed for following the displacement of the position of the stylus on the screen.

The document WO06065380 describes transparent optical digitizer with a position detection device comprising a transparent overlay configured for viewing a display therethough, the overlay comprising a pattern of transparent material, the pattern being indicative of a position on the surface of the transparent layer. The transparent overlay cooperates with a stylus that is displaced thereon to read said pattern.

In WO06065380, the stylus comprises an infrared (IR) emitter and an infrared emitter: upon IR radiation of a portion of the pattern, the pattern emits IR radiations that are process by the stylus to determine the position of the stylus on said display. The pattern is made with pixel comprising 16 bits arranged in a 4 by 4 array and 16 bits in an "L" shaped array. The pixels are made by photolithography or by printing techniques. The IR absorbing material of the pixel is made up with nanoparticles. The disclosed technology is limited to pixel based pattern with a binary data system to encode a portion of the overlay.

The document WO13090494 teaches a digitizer system comprising: a substrate with position-unique photoluminescent indicia; a stylus comprising an optical image sensor configured to sense the photoluminescent indicia. The position-unique photoluminescent indicia comprise a pattern of dots that uniquely define local regions of the substrate, for instance quantum dots.

In WO13090494, each pattern of dots configured to emit distinguishable wavelengths: for instance, one first dot is configured to emit light in a first wavelength range, at least one second dot is configured to emit light in a different second wavelength range. The quantum dots are made with nanoparticles of photoluminescent ink available on the market, for instance a core of CdTeSe with a ZnS shell. However, the document WO13090494 is limited to the collection of available quantum dots.

Therefore, there is a need to provide a solution that overcome or minimize the limitations of the existing solutions.

BRIEF SUMMARY OF THE INVENTION

According to the invention, these aims are achieved by means of a device for a digital writing instrument, the device comprising a substrate with a transparent or translucent layer and a pattern layer on the transparent layer, the pattern layer comprising comprises an active area made with photoluminescent material and an inactive area made with non photoluminescent material, said active area being distinct from said inactive area, said photoluminescent material being transparent under visible light and capable emitting in near infra-red (NIR) or visible radiation upon ultraviolet (UV) light radiation, characterized in that said photoluminescent material of said active area comprises a stack of layers, said stack comprising successive alternate of a first layer and a second layer generating photoluminescent structure at the interface of said first layer and said second layer, and in that the pattern layer comprises a series of N points distributed in a plan (X,Y), N being superior to 2, either said N-points define the active area whereas the inactive area is defined by the area between said N points, or said N-points defines the inactive area whereas the active area is defined by the area between said N points.

In the present invention, the pattern layer is encoded by N points distributed in the plan of said pattern layer. If the N points are made with photoluminescent material to define the active area, the inactive area between the N points is made with non photoluminescent material. Alternatively, if the N points are either made with non photoluminescent material to define the inactive area, the active area between the N points is made with photoluminescent material. In other word, the photoluminescent portion of the pattern (i.e. the active zone) correspond either to N points or to the space between said N points.

In the present invention, a position is encoded by a serie of N points. The pattern layer comprises M surface units corresponding to M positions, each surface unit being encoded by a serie of point. Each serie of point comprises a unique distribution of photoluminescent material on a surface unit.

The composition of the photoluminescent stack of the active areas is unique. In other words, if the pattern is divided in surface units (also called pixel), the composition of the photoluminescent stack of the active areas of each surface units is the same, i.e. with the same excitation wavelength and emission wavelength.

For instance, if the pattern layer comprises a first surface unit and a second surface unit distinct from said first surface unit, the active area being defined by the N points that are made with a photoluminescent stack of layers. The distinguishing feature between the first surface unit and the second surface unit is the distribution of the photoluminescent material on the first surface unit compared to the one of the second surface unit:
  the first surface unit comprises a first series of N points made with the stack and providing a first emission motif to encode a first position on the pattern layer;
  the second surface unit comprises a second series of N points made with the stack and providing a second emission motif to encode a second position on the pattern layer;
  (mutatis mutandis with the potential additional surface units of the pattern layer);

In other words, the distribution of the N points on the pattern layer encoded the pattern so that it is possible to determine a unique position A for instance on said pattern layer depending on the radiation emitted by the photoluminescent material (either from the N points or from the space between said N points) of said position A.

The photoluminescent material is made with a stack comprising layers of metal nitride and/or oxide generated photoluminescent structure at the interface of layers, for instance quantum structure.

Upon UV radiation exposure, the stack emits visible or IR radiation at a determined wavelength. The visible or IR radiation excitation wavelength depends on the composition of the metal nitride and/or oxide of the layers and on the thickness of said stack. The active area is defined by the sum of the areas of made with photoluminescent material of a surface unit. The inactive area is defined by the sum of the areas made with non photoluminescent material of a surface unit.

In an embodiment, a surface unit is a determined surface on the pattern layer, so that the pattern layer is divided in surface units with determined dimensions. Each surface unit gathers a number of points comprises within the limitation of the boundaries of the surface unit. For instance, a surface unit is a square surface named pixel, with dimensions comprises between X and Y.

In one embodiment, the non photoluminescent material is a stack of layers, preferably the same stack as the photoluminescent material.

In an embodiment, the non photoluminescent material is made with a material showing a refractive index close to the refractive index of the stack of the photoluminescent material.

In one embodiment, the photoluminescent material and the non photoluminescent material are made with a stack of layers with layers having the same composition, the photoluminescent stack being treated to provide a non photoluminescent stack. This facilitates the manufacturing of the device: the pattern layer is made with the same stack. A treatment subsequently allows defining the active area from the inactive area on said pattern layer, for instant a treatment modifying the quantum structures present within the stack and which diminish in a significant manner their photoluminescent characteristics, so the reading device (i.e. stylus) can easily distinguish between the photoluminescent and the non photoluminescent material.

In the present invention, the user can tune the composition, and/or the thickness of the first and second layer depending on the excitation wavelength $\lambda ex$ and/or on the emission wavelength $\lambda em$.

In one embodiment, the excitation wavelength of the stack is comprised between about 360 nm and 375 nm, preferably 360 nm and 370 nm, in particular 365 nm.

In an embodiment, the emission wavelength of the stack is comprised between about 600 nm and 850 nm, preferably 650 nm and 700 nm, in particular 670±10 nm.

In an embodiment, the N points have dimensions between 2 µm and 400 µm, preferably between 20 µm and 200 µm, in particular 50 µm. The smaller the points dimensions, the denser the distribution of the N points on the pattern layer, the higher the resolution of the generated digital writing. For instance, for small devices with sizes between 5 and 12 inches (typically smartphones and tablets), it is preferably to have points dimensions ranging from 5 to 15 µm in order to insure a good quality of digital writing. For larger devices with sizes from 15 to 30 inches (typically laptops and desktop computers), points dimensions ranging from 15 to 30 µm shall be enough to insure a good quality of digital writing. For much larger devices with sizes above 40 inches (typically TVs and digital whiteboards), points dimensions ranging from 50 to 200 µm shall be enough to insure good to reasonably good quality of digital writing.

In an embodiment, the surface unit have an area comprises between about 100 µm$^2$ and about 5 mm$^2$, preferably between 200 µm$^2$ and about 2 mm$^2$. The surface unit represents the resolution unit of the said device for digital writing (equivalent to a pixel in an LCD or OLED display). In other terms, for a given surface area of the pattern layer, the smaller the surface unit, the larger the number of surface units, higher the resolution of the generated digital writing. For instance, for small devices with sizes between 5 and 12 inches (typically smartphones and tablets), it is preferably to have surface units with dimensions ranging from 1,000 to 10,000 µm$^2$ (0.001-0.01 mm$^2$) in order to insure a good quality of digital writing. For larger devices with sizes from 15 to 30 inches (typically laptops and desktop computers), surface units with dimensions ranging from 20,000 to 50,000 µm$^2$ (0.02-0.05 mm$^2$) shall insure a good quality of digital writing. For much larger devices with sizes above 40 inches (typically TVs and digital whiteboards), points dimensions ranging from 160,000 to 2,250,000 µm$^2$ (0.16-2 mm$^2$) shall insure good quality of digital writing.

In an embodiment, there are between 4 points per surface unit and 100 per surface unit, preferably between about 10 and 30. For a given resolution of the pattern layer, the larger the surface of the pattern layer and the higher the number of surface units (in other words pixels). Therefore, a higher number of unique distributions of points per surface unit need to be generated. In order to guarantee such a high number of unique distributions, it is preferable to use a larger number of points per surface unit.

Being able to host larger points per surface unit allows a better redundancy of the digital writing function. This is by typically duplicating twice (or trice) the same unique distribution of points within the same surface unit, so if one of the point distributions was damaged during the pattern layer processing, still the other(s) points distribution(s) remain(s) valid.

Being able to host larger points per surface unit allows to assign on top of the XY coordinate additional function(s) per surface unit. Typically, by embedding two unique distributions of points within the same surface unit, while one is assigned to the XY coordinate determination, the other can be assigned for instance to a specific feature of the digital writing as; color of the writing, thickness of the writing, erase of the writing, color of the background on which the digital writing appears, etc. . . .

In an embodiment, the stack comprises at least two first layers and two second layers, the stack having thickness inferior to 2 µm.

In one embodiment, the first and/or second layer comprises a metal oxide. Metal oxide are advantageously easier to manipulate and to synthetize that metal nitride. Additionally, metal oxides offer a variety of bandgap energies, which differ from metal nitride bandgap energies. This enlarges the range of possible stack combinations comprising layers of metal nitrides and/or metal oxides generated photoluminescent structure at the interface of layers, for instance quantum structure.

In an embodiment, said N points have a shape chosen among various forms, preferably regular and simple geometrical forms as; triangular, rectangular, rhombohedral, pentagonal, hexagonal, heptagonal, octagonal, nonagonal, decagonal, circular and/or oval forms.

In one embodiment, said points are distributed homogeneously or heterogeneously in the pattern layer. Typically, (i) a homogenous distribution of points with a unique combination of different geometrical forms per surface unit and/or (ii) a heterogenous distribution of points with a common geometrical form per surface unit.

In an embodiment, the pattern layer has a thickness between 10 nm and about 2 mm, preferably between about 10 nm and about 1 mm. The thickness of the pattern layer depends on the type of stack chosen to deliver a target photoluminescent intensity at the desired emission range (wavelength). The said type of stack comprises a defined combination of layers of metal nitrides and/or metal oxides. For a given emission range, if target photoluminescent intensity is low, a thin pattern layer shall be enough. If target photoluminescent intensity is high, a thicker pattern layer will be needed.

Also, the surface conditions of the transparent layer on top of which the pattern layer is processed might affect the quality of the said processed pattern layer. By surface conditions, it is meant (i) type of crystallinity, typically monocrystalline, polycrystalline or amorphous and (ii) degree of surface roughness (i.e. Ra or RMS).

For instance, a monocrystalline transparent layer with an extremely low surface roughness (e.g. RMS≤1) will allow to achieve a pattern layer of good quality at a relatively low total thickness (e.g. 20~100 nm), while an amorphous transparent layer with identical surface roughness (i.e. RMS≤1) will allow to achieve a pattern layer of equivalent quality at a relatively larger thickness (e.g. 300~800 nm). In comparison, an amorphous transparent layer with a relatively rough surface (e.g. RMS>50) will allow to achieve a pattern layer of equivalent quality at a much higher thickness (e.g. 20~100 μm). in other words, the more amorphous the transparent layer and the rougher the surface, the thicker pattern layer will be to achieve a pattern layer of good quality. By good quality, it is meant a pattern layer embedding quantum structures at its interface(s).

In an embodiment, the first layer has a thickness comprised between about 1 nm and 20 nm, preferably between about 2 nm and 10 nm.

In an embodiment, the second layer have a thickness comprised between about 1 nm and 50 nm, preferably between about 8 nm and 30 nm.

In one embodiment, the transparent or translucent layer comprises mineral glass or sapphire glass. Depending on the type of application (environment and/or context of use), mineral glass might not be robust enough to endorse physical damages. Typically sapphire glass can be a good candidate to replace mineral glass.

In an embodiment, the stack has a thickness comprises at least one pair of layers (i.e. one first layer and one second layer) and maximum 500 pairs of layers, preferably between about 20 and 300 pairs.

The total number of pairs defines the photoluminescent intensity delivered by the stack, and thus the overall thickness of the stack. For a given stack, the more the pair of layers, the more intense the stack is photoluminescent. For instance, if minimum (very low) photoluminescent intensity is needed, a few pair of layers shall be sufficient, while if maximum photoluminescent intensity is required (very high), a much larger pairs of layers shall be targeted.

In an embodiment, the transparent layer is chosen among amorphous glass, a polycrystalline glass, a monocrystalline sapphire, a ceramic, a ferrous and non-ferrous alloy.

In one embodiment, the device further comprises a filtering layer on the pattern layer for filtering any undesired light emitted by the transparent layer on top of which the pattern layer is processed. Thus only the emitted light from the photoluminescent portion of the said pattern layer is detected by a sensor device placed on the pattern layer.

In an embodiment, the device further comprises a protective coating covering said pattern layer. The protective coating prevents the pattern layer and the transparent layer from damages such as shock or impact.

In one embodiment, the device is designed for being placed on a display of a device, for instance a computer display, a television display, a telephone display in particular a smartphone display, a tablet display, a digital whiteboard.

In one embodiment, the device is designed for being connected to a display projector, so the digital writing is projected onto a surface, for instance a wall, a whiteboard or a table.

In one embodiment, the device the first layer and/or the second layer comprises an alloy, for instance a metal oxide alloy ABOx or a nitride oxide alloy A'B'Nx, with A, A', B and B' being metal element.

The metal oxide/nitride alloy layer (i.e. ABOx or A'B'Nx) presents a different bandgap energy level from the metal oxide/nitride layer. When the first and/or second layer is replaced by an alloy, it results a new stack with quantum structures exhibiting modified photoluminescent properties, for instance the range of emission.

In an embodiment, the metal oxide is chosen among SiOx, ZnO or an alloy of said metal oxide.

In one embodiment, the metal nitride is chosen among AlN, GaN, InN or an alloy of said metal nitride.

In an embodiment, the stack further comprises at least one third layer between the first layer and the second layer, or between two first layers or between two second layers, for instance one third layer, or two third layers, or three third layers The additional layer, for instance the third layer, allows to reengineer the initial bandgap energy structure in order to modify the quantum structures present at the interface, and thus the photoluminescent properties, for instance the range of emission. The third layer can form an alloy with the first layer or with the second layer.

In an embodiment, the additional layer comprises a metal sulphide, preferably chosen among ZnS, CdS or an alloy of said metal sulfide.

In an embodiment, the additional layer comprises a cadmium telluride or cadmium selenide, preferably chosen or an alloy of cadmium telluride and cadmium selenide.

In one embodiment, the additional layer comprises a metal arsenide, preferably chosen among AlAs, GaAs or an alloy of said metal arsenide.

The invention also concerns a method for manufacturing a stack of photoluminescent material, the method comprises
  i) Placing a substrate in a chamber designed for metal oxide and/or nitride oxide depositing on a substrate;
  ii) Depositing a pattern layer on the substrate, said pattern layer comprising an active area made with photoluminescent material and an inactive area made with non photoluminescent material, said active area being distinct from said inactive area, said photoluminescent material being transparent under visible light and capable emitting in near infra-red (NIR) or visible radiation upon ultraviolet (UV) light radiation, said photoluminescent material of said active area comprises a stack of layers, said stack comprising successive alternate of a first layer and a second layer generating photoluminescent structure at the interface of said first layer and said second layer, the pattern layer comprises a series of N points distributed in a plan (X,Y), N being superior to 2, either said N-points define the active area whereas the inactive area is defined by the area between said N points, or said N-points defines the inactive area whereas the active area is defined by the area between said N points;
  ii) Controlling the parameter of the chamber during the deposit step to tune said photoluminescent structure so that the active area emits at a determined wavelength upon UV radiation;

Advantageously, the method according to the present invention is flexible and allows tuning the optical properties of the pattern layer. In other words, surprisingly the treating step modify the photoluminescent properties of the photoluminescent structure at the interface of the first and second layer. For instance, the treating step permit to shift the emission wavelength from a $\lambda em1$ to $\lambda em2$.

The applicant found out the parameter of the chamber where the pattern layer is disposed during manufacturing have an impact on the photoluminescent properties of the pattern layer. Modifying the parameter of the chamber might induce structural modifications of the photoluminescent structure at the interface of the first and second layer.

The method provides flexibility the user that can design the pattern layer depending on target wavelength emission, for instance over the range of visible to near infrared (NIR) emission.

In an embodiment, the parameters are chosen among temperature of the chamber, pressure of the chamber, composition of the atmosphere of the chamber, duration of treatment. Also, depending of type of substrate onto which the pattern layer is used (e.g. mineral glass, sapphire glass, ceramic or metal alloy), a corresponding set of parameters is generated and used to allow the adequate process of the pattern layer while preserving the physical and chemical integrity of said transparent layer, for instance the physical form of the substrate, the mechanical properties of the substrate and/or the optical properties of the substrate.

In one embodiment, the temperature of the chamber varies between room temperature, i.e. about 25°, and 850° C. The temperature preferably depends on the growth method:
  For instance between 700° C. and 800° C. for CVD (Chemical Vapor Deposition);
  For instance between room temperature, i.e. about 25° C., and 300° C. for PVD (Physical Vapor Deposition)

The growth method is selected according to the type of substrate onto which the pattern layer is processed. For instance CVD method if substrate material is made of sapphire glass, ceramics or ferrous alloys. PVD method is chosen if the substrate material is made of mineral glass, in particular tempered mineral glass or non-ferrous alloy.

In an embodiment, the pressure of the chamber varies between $10^3$ bars and $10^8$ bars. The pressure preferably depends on the growth method:
  For instance about $10^6$ bars for CVD (Chemical Vapor Deposition);
  For instance about $10^4$ bars for PVD (Physical Vapor Deposition)

In one embodiment, the composition of the atmosphere comprises Hydrogen, Oxygen, Argon. Preferably, the gas type and mixture ration depends on the growing method:
  Oxygen or Hydrogen for CVD;
  70/30 mixture of Argon/Oxygen for PVD In an embodiment, the parameters are the following:
  The temperature of the chamber varies between 150° and 300° C.;
  The pressure of the chamber varies between $5\times10^4$ bar and $5\times10^5$ bar;
  The gas composition of the chamber atmosphere varies ±15% from the ration Oxygen/Argon of 30/70.

In one embodiment, the substrate is chosen among amorphous glass, a polycrystalline glass, a monocrystalline sapphire, a ceramic, a ferrous alloy. Depending on the target application, the appropriate substrate is chosen for instance mineral glass for average priced smartphones and monocrystalline sapphire glass for high priced smartphones.

The invention also relates to a method for determining the position of a stylus on a surface of a device, the process comprising:
  i) Providing a device with a surface comprising pattern layer, said pattern comprising an active area made with photoluminescent material and an inactive area made with non photoluminescent material, said active area being distinct from said inactive area, said photoluminescent material being transparent under visible light and capable emitting in near infra-red (NIR) or visible radiation upon ultraviolet (UV) light radiation, said photoluminescent material of said active area comprises a stack of layers, said stack comprising successive alternate of a first layer and a second layer generating photoluminescent structure at the interface of said first layer and said second layer, the pattern layer comprises a series of N points distributed in a plan (X,Y), N being superior to 2, either said N-points define the active area whereas the inactive area is defined by the area between said N points, or said N-points defines the inactive area whereas the active area is defined by the area between said N points;
  ii) Providing a UV source capable of emitting a UV radiation, and a detecting device capable of detecting a NIR or visible radiation;
  iii) Displacing the stylus on the surface of the device while the UV source is emitting UV radiation towards the pattern layer;
  iv) Detecting the NIR or visible radiation emitted by the pattern layer in response to the UV radiation;
  v) Determining the position of the stylus on the surface depending on the NIR or visible radiation detected by the stylus.

Advantageously, the present invention allows determining the position of the stylus (or another device that can detect the emission of the pattern layer) independently from the display energy supply: in other words, the emission of NIR or visible light from the pattern layer does not require energy, contrary to methods based on capacitance, for instance multi-touchscreen method that require a continuous supply of energy.

The present invention has no impact or very limited impact on the battery of the device covered by the glass, therefore enhancing the device autonomy.

In the present invention, the device, for instance a glass, is passive, its role is solely to absorb partially or fully the UV light emitted by the stylus. The stylus measures the emission of NIR or visible light from the photoluminescent material in response to the UV illumination and processes the data to determine the position of the stylus depending on the measured emission from the photoluminescent material of the glass. Alternatively, the stylus transmits the data, such as frames or series of points, to a processing unit, for instance a computer or a tablet or a smartphone, that will determine its position based on the emission provided by the series of points of the pattern layer.

Therefore, advantageously, the determination of the position of the stylus has no impact on the energy supply or battery of the device, contrary to the existing capacitive method that is energy dependent.

In an embodiment, the method comprises:
determining an absolute detection of the position of the stylus.

The stylus detects the presence of the photoluminescent material of the active area. Considering that the pattern layer consists of N surface units each comprising a serie of N points distributed in a unique way per each surface unit of the pattern layer. The stylus moves on the surface of the pattern layer, while emitting UV light, and recognizes the unique point distribution of each surface unit. By assigning within a database a different XY coordinates to each surface unit, it is possible to determine the exact position of the stylus.

In an embodiment, the method comprises:
Providing a UV source capable emitting UV radiation in a direction substantially parallel to the surface of the device, for instance the edge of the surface of the device.

Such a configuration shows potential advantages
(i) integrating the UV source to the surface of the device allows to remove the UV source from the stylus, so the stylus could be redesigned in a simpler way and with an improved ergonomic;
(ii) integrating the UV source adjacent to the edge the device allows to reduce significantly the thickness of the said device and render it very slim. This could be a beneficial feature from an esthetical view point;
When the UV radiation comes is provided substantially parallel to the surface, the pattern layer acts as a wave guide to allow the propagation of the UV radiation through the pattern layer.

In one embodiment, the process for determining the position of a stylus on the surface of a device uses the device according to the invention.

The invention also concerns a system for digital writing technology, the system comprising:
a device according to the present invention;
a display comprising a surface, said surface being covered by said device,
an UV module designed for emitting UV radiation toward the surface of the device;
an IR module designed for receiving the NIR or visible light emitted from the surface of the device upon UV irradiation from the UV module;
processing means for writing on said display depending on the detected position of the stylus on said device.

The transparent (or translucent) layer of the device can be the cover glass of a display, for instance a TV and/or a tablet display.

In an embodiment, the display is a chosen among computer display, a television display, a telephone display in particular a smartphone display, a tablet display, a digital whiteboard.

In one embodiment, the UV module is designed for emitting UV radiation in a direction substantially parallel to the surface of the device;

In an embodiment, the UV module and the IR module are accommodated in a stylus.

The invention further concerns a stylus designed for being use with the device according to the invention, said stylus being capable of reading the pattern layer of said device, the stylus comprising:
A power source;
A module for emitting UV light;
A module for detecting NIR or visible light.

In an embodiment, the stylus further comprises a transmission module for transmitting the data related to detected NIR or visible to a processing device for processing the data, for instance over a Bluetooth interface or other wireless connection, or a wire connection.

In one embodiment, the stylus further comprises an inertial sensor for determining a contact between the stylus and a surface and/or for determining displacements of the stylus on a surface.

In the present invention, the embodiments describe for the device according to the present invention also apply mutatis mutandis to the system, the process of manufacturing, the process for determining the position and to the stylus according to the invention and vice versa.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
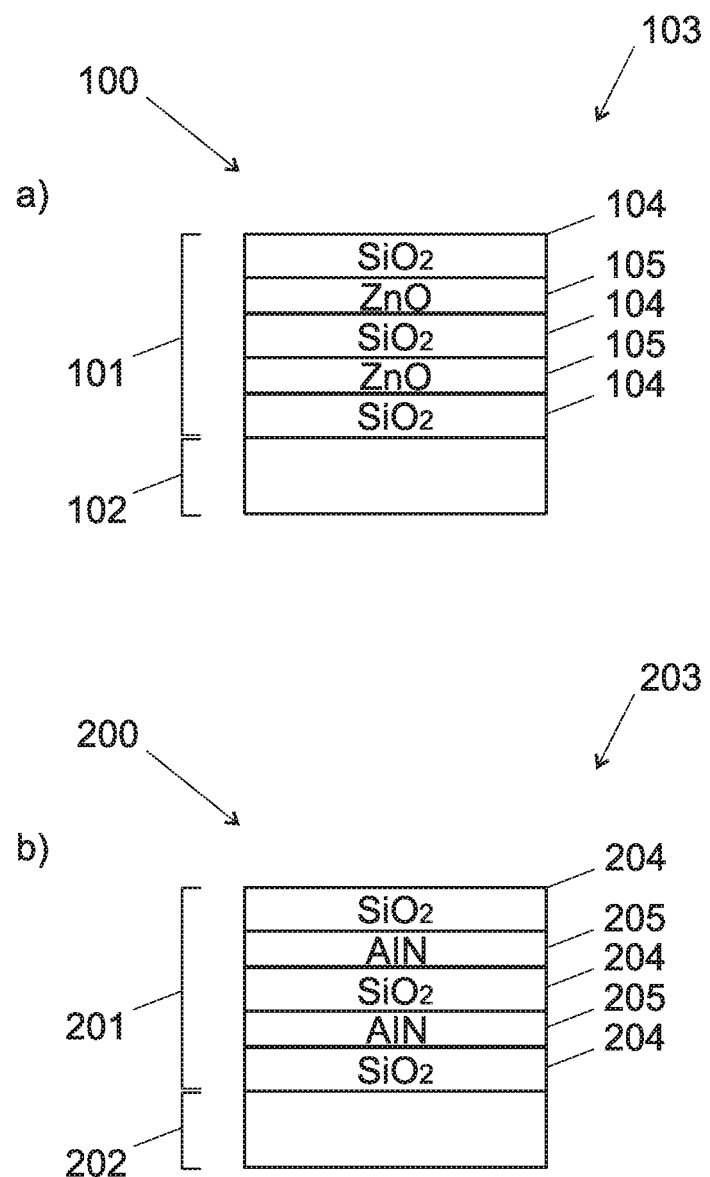
FIGS. 1a and 1b show two devices according to the invention.
Figure 2:
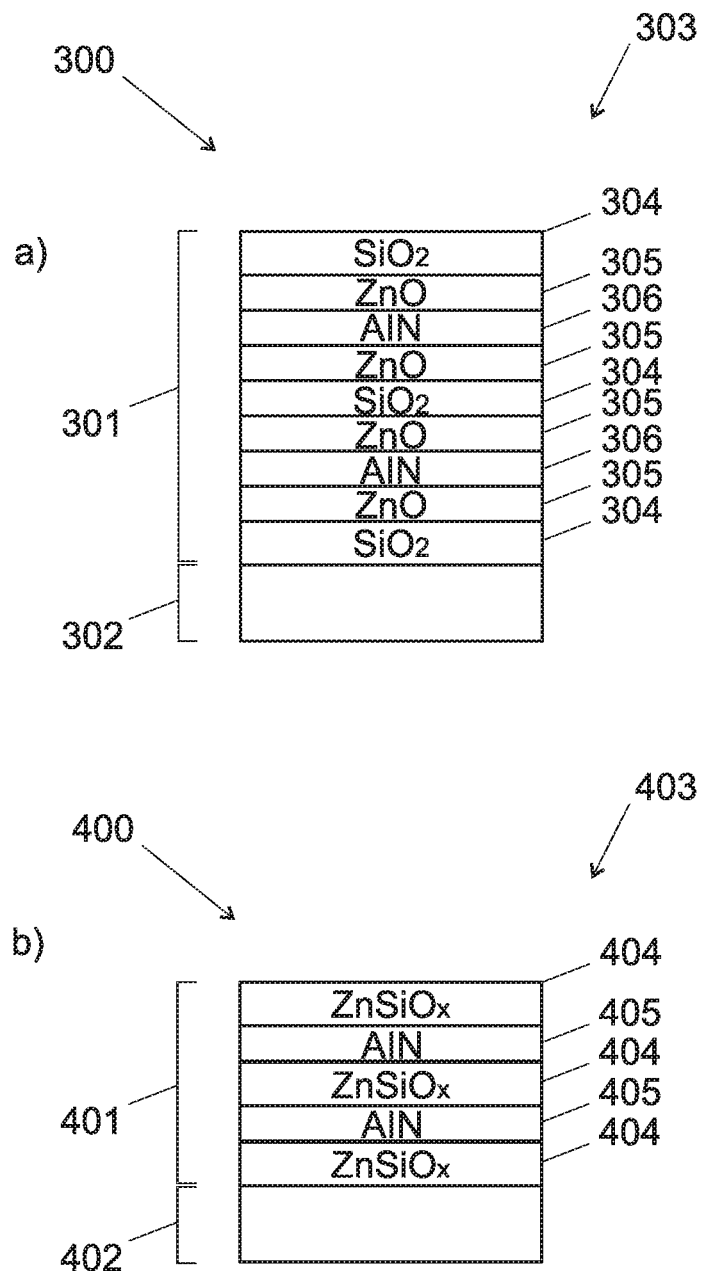
FIGS. 2a and 2b show two devices according to the invention.

Examples of the claimed invention is described below together with FIGS. 1 to 7, but the invention is not limited to these examples.

FIGS. 1a, 1b, 2a and 2b, 3a and 3b illustrate embodiments of the device according the invention. FIGS. 1, 2 are section view of the device and only represent a portion of the device. The devices 100,200,300,400,900,1000 comprise a pattern layer 101,201,301,401,901,1001 and a transparent layer 102,202,302,402,902,1002. The transparent layer 102,202, 302,402,902,1002 is made of amorphous glass. The pattern layer 101,201,301,401,901,1001 comprises a stack 103,203, 303,403,903,1003 whose composition varies between the devices 100,200,300,400,900,1000.

The stack 103 of the device 100 represented in FIG. 1a comprises $SiO_2$ as a first layer 104 and ZnO as a second layer 105. In this embodiment, the first layer is 8 nm thick and the second layer is 5 nm thick.

The stack 203 of the device 200 represented in FIG. 1b comprises $SiO_2$ as a first layer 204 and AlN as a second layer 205. In this embodiment, the first layer is 8 nm thick and the second layer is 3 nm thick.

The stack 303 of the device 300 represented in FIG. 2a comprises $SiO_2$ as a first layer 304 and ZnO as a second layer 305. The stack 303 further comprises AlN as a third layer 306, said third layer AlN being comprised between two second layer ZnO 305. In this embodiment, the first layer is 8 nm thick, the second layer is 5 nm thick, the third layer is 3 nm thick.

The stack 403 of the device 400 represented in FIG. 2b comprises $ZnSiO_x$ which is an alloy as a first layer 404 and AlN as a second layer 405. In this embodiment, the first layer is 15 nm thick and the second layer is 3 nm thick.

The stack 903 of the device 900 represented in FIG. 3a comprises $SiO_2$ as a first layer 904 and ZnO as a second layer 905. The stack 903 further comprises AlN and GaN as a third layer 906, the layer of GaN being between two layers of AlN. In this embodiment, the first layer is 5 nm thick, the second layer is 7 nm thick, the third layers are 3 nm thick.

The stack 1003 of the device 1000 represented in FIG. 3b comprises $ZnSiO_x$ which is an alloy as a first layer 1004 and AGaIN as a second layer 1005. In this embodiment, the first layer is 12 nm thick and the second layer is 5 nm thick.

When the stack comprises one third layer or several third layers, alloy formation can occur between said third layer and the first layer or the second layer. The formation of alloy depends on (i) the composition of the third layer and the first or second layer, (ii) the geometry of said stack and (iii) the process conditions. For instance, in FIGS. 2a and 2b, alloy formation between $SiO_x$ and ZnO can be favorized, while chances for alloy formation between ZnO and AlN can be limited a. Reciprocally In FIG. 3a, one could expect an alloy formation between $SiO_x$ and ZnO on one hand, and on the other hand between AlN and GaN.

The invention is not limited to the illustrated device 100,200,300,400. For instance, the stack can comprise binary system (i.e. system with a first layer and a second layer) comprising $Al_2O_3$/ZnO, $ZnO/SiO_2$, ZnO/GaN, AlN/$SiO_2$, ZnS/$SiO_2$, AlN/ZnS, AlN/ZnSe, GaN/SiC; or ternary system (with a first layer, a second layer and a third layer) comprising $Al_2O_3$/ZnO/$SiO_2$, ZnO/AlN/$SiO_2$, ZnO/GaN/$SiO_2$, AlN/GaN/$SiO_2$, InN/AlN/ZnO, InN/GaN/ZnO.

Typically, the stack can comprise layers combination of II-VI and/or II-V.

The device illustrated on FIG. 2a is manufactured by PVD with the following parameters:

Temperature range: 200-300° C.

Atmosphere 1: gas mixture Oxygen/Argon ranged from 15/85 to 30/70

Atmosphere 2: gas mixture Nitrogen/Argon ranged from 25/75 to 40/60

Process pressure range: $5 \times 10^5$-$10^4$ bar number of pairs of first and second layers: 20 to 50

Process duration: mostly depends on the PVD system design and thus, varies from one reactor to another, for instance within the hour range (2 h~5 h)

Figure 4:
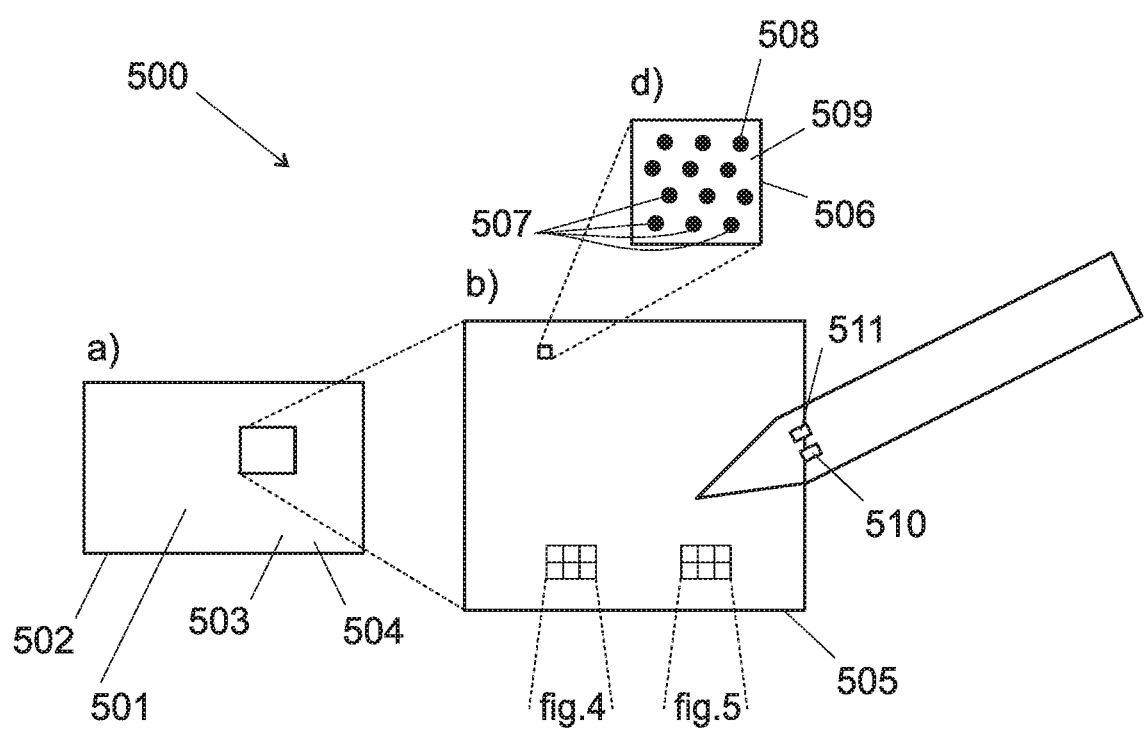
FIG. 4 shows a system according to the invention.

FIG. 4 represents a system 500 according to the present invention. The system 500 comprises a device 501 according to the invention, for instance a device illustrated in FIG. 1a,b or 2a,b. The device 501 covers a display 502, in this embodiment a TV display. The device 501 comprises a pattern layer 503 and a transparent layer 504.

FIG. 4b illustrates a portion 505 of the device 501, said portion being divided in surface unit 506.

Figure 5:
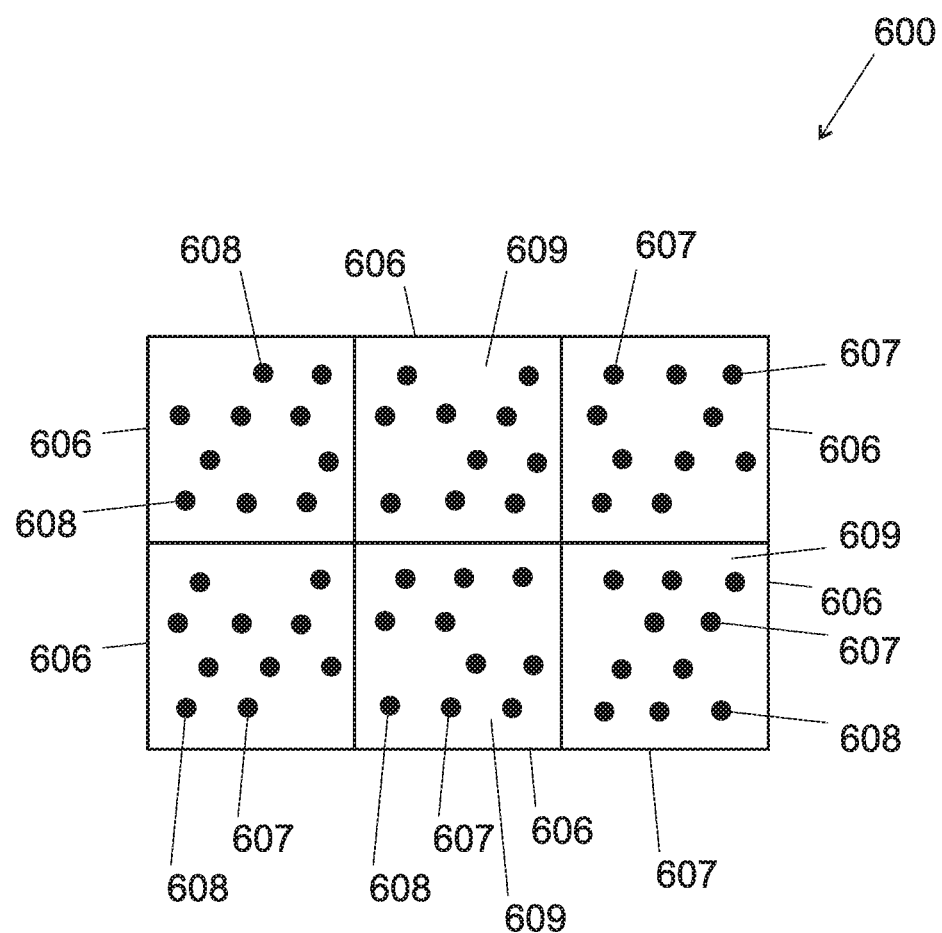
FIG. 5 shows an encoded surface of a device according to the invention.
Figure 6:
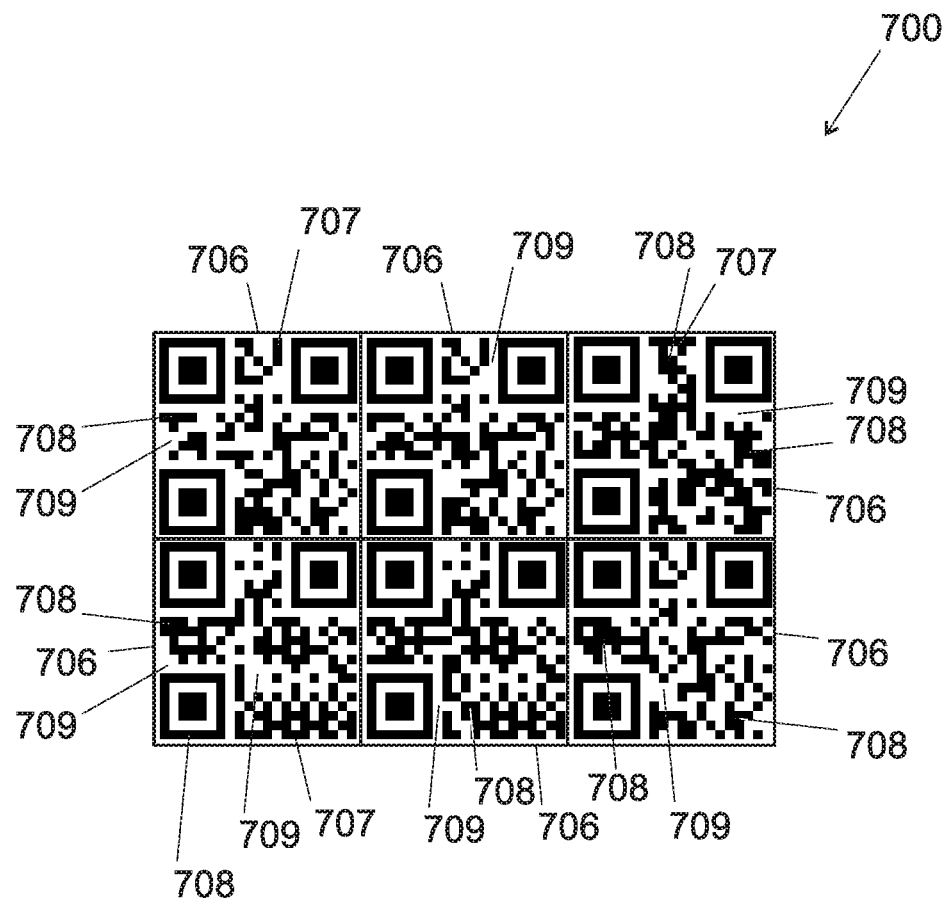
FIG. 6 shows an encoded surface of a device according to the invention.

Each surface unit 506 comprises a serie of N-points as represented in FIG. 4c. The surface unit 506 represented in FIG. 3c comprises nine points, said N-points encoding one position on the pattern layer 503, and thus on the device 501. In the present embodiment, the points 507 are cylindrical shaped points, with a diameter of 50 μm. The pattern layer 503 further comprises an area between the points 507. If the points are made with photoluminescent material and define the active area, the inactive area is defined by the area between the points, as represented in FIG. 5. If the points are made with non photoluminescent material and define the inactive area, the active area is defined by the area between the points that is made with photoluminescent material as represented in FIG. 6.

The system further comprises a stylus 510, said stylus comprises a UV module 511 for emitting UV radiation toward the pattern layer 503. The stylus 510 further comprises an IR module 512 for receiving NIR or visible light emitted from the pattern layer 503 upon UV radiation.

Figure 3:
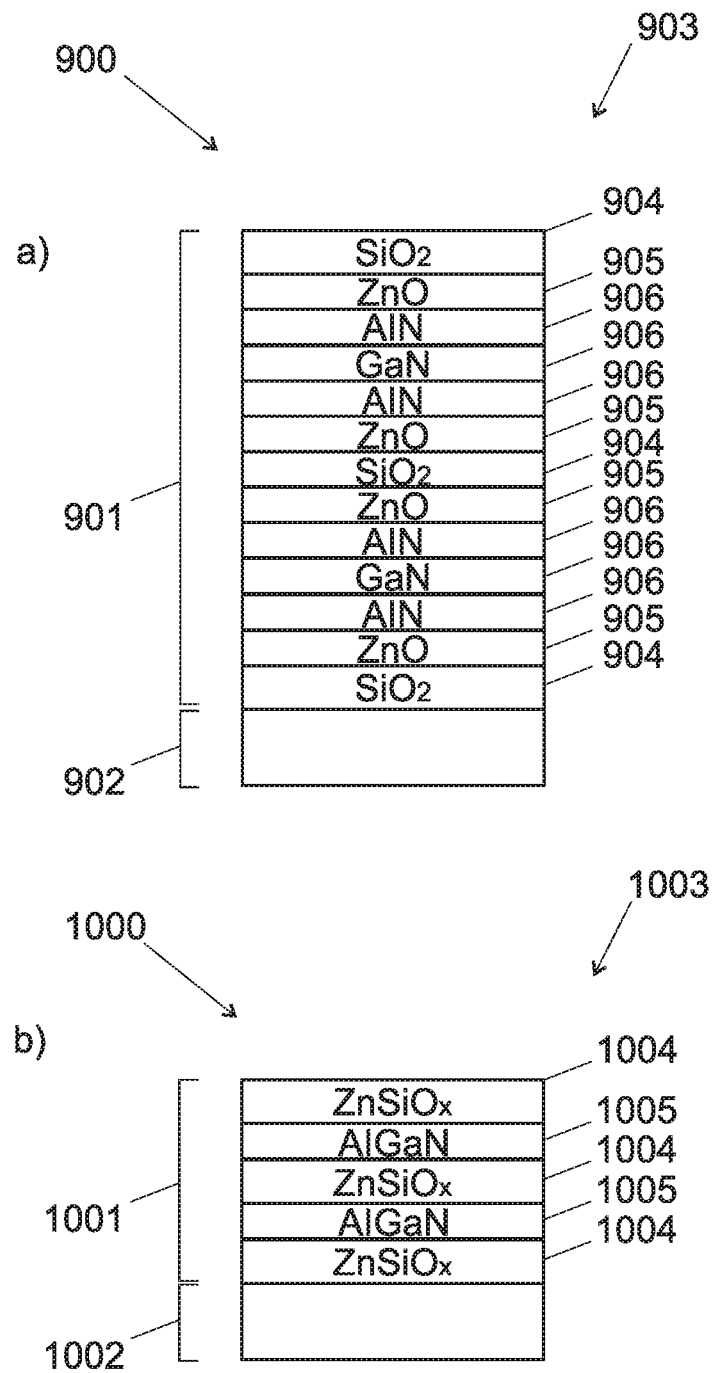
FIGS. 3a and 3b show two devices according to the invention.

FIG. 5 is a partial view of the pattern layer 503 of FIG. 3 showing 6 surface units 606. Each surface unit 606 of FIG. 5 comprises a specific distribution of N-points 607, N being equal to ten points in the present embodiment. In one embodiment, the point 607 are made with photoluminescent material, thereby defining the active area 608 with photoluminescent properties. The inactive area is defined by the area between the points, said inactive area 609 being made with non photoluminescent material. In another embodiment, the points 607 are made with non photoluminescent material, thereby defining the inactive area 608. The area between the points being made with photoluminescent material with photoluminescent properties.

The distinguishing feature between the surface units 606 is the distribution of the points 607 on the surface unit 606. In other words, each surface unit 606 has a specific distribution of points 607 that encode a unique position on the pattern layer 503. When the stylus is facing one surface unit 606, the motif of the NIR radiation received by the IR module will depends on the distribution of the points. Thus, it is be possible to determine the position of the stylus 510 on the pattern layer 503 by processing the NIR radiation received by said IR module 512.

Alternatively, the surface unit 506 can be encoded with two dimensions codes like QR code, as represented in FIG. 6. The points are replaced by two dimensions elements 707 distributed on the surface unit 706, each two dimensions element 707 being made either with photoluminescent material or non photoluminescent. The surface unit 506 further comprising area between the two dimensions element 707 that can be made either with photoluminescent material to define the active area 708 if the two dimensions element 707 are made with non photoluminescent material (inactive area 709) or with non photoluminescent material defining the inactive area 709 if the two dimensions element 707 are made with photoluminescent material (active area 708). To determine the position of the stylus, the process described for surface unit with point of FIG. 5 also applies to two dimensions element: upon UV radiation, each surface unit 706 emit a specific IR radiation motif encoding a unique position.

Figure 7:
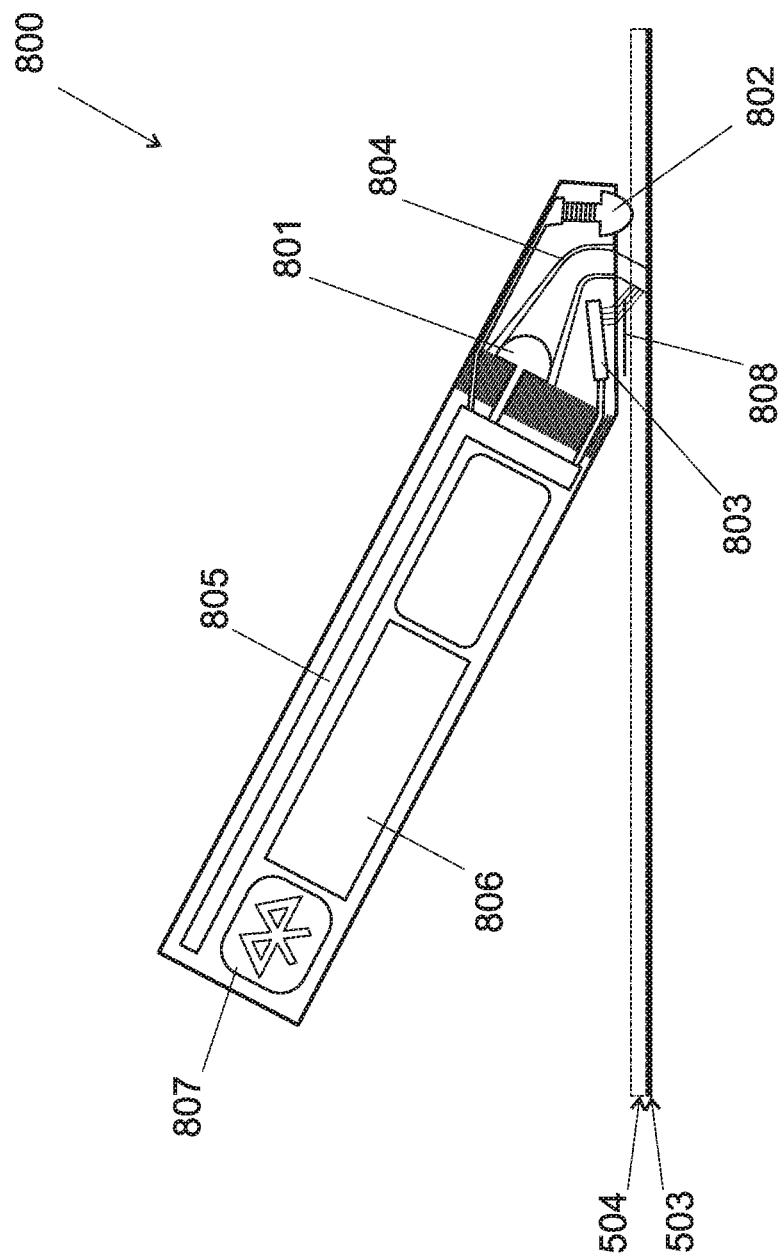
FIG. 7 represents a stylus according to the invention.

FIG. 7 represent a stylus 800 according to the invention designed for being used with a device according to the present invention. The stylus 800 comprises an UV module 801 that is controlled by a UV activator 802 that triggers the UV radiation of the module 801 when said detector 801 detects the surface of the device. In the present embodiment, the UV module emits at 365 nm, said radiation being guided via an optical fiber 804.

The stylus 800 further comprises an IR sensor or module 803 to treat the NIR radiation emitted by the surface of the device upon UV radiation. The NIR radiation are transmitted to processing means designed for treating the signal. The processing means comprises notably a circuit board 805.

The stylus 800 further comprises a battery 806, in particular a rechargeable battery. The processing means can be coupled to transmission means, for instance Bluetooth connection means 807 to export the data to an external processor (not represented in figures).

The stylus 800 also comprises a filter 808 for filtering (i) parasitic emission from the substrate onto which the pattern layer is processed, for instance mineral glass; (ii) parasitic emission from the UV source of the stylus and reflected by the substrate onto which the pattern layer is processed.

NUMÉROS DE RÉFÉRENCE EMPLOYÉS SUR LES FIGURES

100 Device according the invention
101 Pattern layer
102 Transparent layer
103 Stack
104 First layer
105 Second layer
200 Device according to the invention
201 Pattern layer
202 Transparent layer
203 Stack
204 First layer
205 Second layer
300 Device according to the invention
301 Pattern layer
302 Transparent layer
303 Stack
304 First layer
305 Second layer
306 Third layer
400 Device according to the invention
401 Pattern layer
402 Transparent layer
403 Stack
404 First layer
405 Second layer
500 System according to the invention
501 Device
502 display
503 Pattern layer
504 Transparent layer
505 Portion of the pattern layer
506 Surface unit
507 Point
508 Photoluminescent material
509 Non photoluminescent material
510 Stylus
511 UV module
512 IR module
600 Device according to the invention
606 Surface unit
607 Points
608 Active area
609 Inactive area
700 Device according to the invention
706 Surface unit
707 Two dimensions element
708 Active area
709 Inactive area
800 Stylus according to the present invention
801 UV module
802 UV activator
803 IR sensor
804 Optic fiber
805 Circuit board
806 Battery
807 Bluetooth connection means
808 Optical filter
900 Device according to the invention
901 Pattern layer
902 Transparent layer
903 Stack
904 First layer
905 Second layer
906 Third layer
1000 Device according to the invention
1001 Pattern layer
1002 Transparent layer
1003 Stack
1004 First layer
1005 Second layer

The invention claimed is:

1. A device for a digital writing instrument, the device comprising a substrate with a transparent or translucent layer and a pattern layer on the transparent or translucent layer,
the pattern layer comprising an active area made with photoluminescent material and an inactive area made with non photoluminescent material, said active area being distinct from said inactive area,
said photoluminescent material being transparent under visible light and capable of emitting in near infra-red (NIR) or visible radiation upon exposure to ultraviolet (UV) light radiation,
wherein said photoluminescent material of said active area comprises a stack of layers, said stack comprising successive alternate first and second layers generating photoluminescent structures at the interface of said first layers and said second layers,
in that the photoluminescent material and the non-photoluminescent material are made with a stack of layers with layers having the same composition, the photoluminescent stack being treated to provide a non-photoluminescent stack, and in that the pattern layer comprises a series of N points distributed in a plan (X,Y), N being superior to 2,
either said N-points define the active area and the inactive area is defined by the area between said N points,
or said N-points defines the inactive area and the active area is defined by the area between said N points.

2. The device according to claim 1, wherein said first layer has a thickness between 1 nm and 20 nm and said second layer has a thickness between 1 nm and 7 nm.

3. The device according to claim 1, wherein said second layer has a thickness between 1 nm and 50 nm.

4. The device according to claim 1, wherein the stack comprises at least two first layers and two second layers, the stack having a thickness inferior to 2 µm.

5. The device according to claim 1, wherein the first layer comprises a metal oxide or a metal nitride, the second layer comprises a metal oxide or a metal nitride, or both the first layer and the second layer comprise a metal oxide or a metal nitride.

6. The device according to claim 1, wherein the first layer, the second layer, or both the first layer and the second layer comprise(s) an alloy, a metal oxide alloy ABOx, or a metal nitride oxide alloy A'B'Nx, with A, A', B and B' being a metal element.

7. The device according to claim 5, wherein the metal oxide comprises SiOx, ZnO, or an alloy of said metal oxide.

8. The device according to claim 5, wherein the metal nitride comprises AlN, GaN, InN, or an alloy of said metal nitride.

9. The device according to claim 1, wherein the stack further comprises at least one third layer between the first layer and the second layer, between two first layers, or between two second layers.

10. The device according to claim 9, wherein said third layer comprises a metal sulphide, ZnS, CdS, or an alloy of said metal sulfide.

11. The device according to claim 8, wherein said third layer comprises a cadmium telluride, cadmium selenide, or an alloy of cadmium telluride and cadmium selenide.

12. The device according to claim 8, wherein said third layer comprises a metal arsenide, AlAs, GaAs, or an alloy of said metal arsenide.

13. The device according to claim 1, wherein the pattern layer has a thickness between 10 nm and 2 mm.

14. The device according to claim 1, wherein the device further comprises a filtering layer on the pattern layer for filtering any undesired light emitted by the transparent or translucent layer.

15. The device of claim 1, wherein the second layer is thicker than the first layer.

16. The device of claim 1, wherein the first layer and the second layer comprise different materials.

17. The device of claim 1, wherein (i) the first layer comprises silicon dioxide and the second layer comprise zinc oxide, (ii) the first layer comprises silicon dioxide and the second layer comprise aluminium nitride, (iii) the first layer comprises ZnSiOx and the second layer comprise aluminium nitride, or (iv) the first layer comprises ZnSiOx and the second layer comprise aluminium gallium nitride.

18. The device of claim 1, wherein the stack comprises a third layer and a fourth layer, the first, second, third, and fourth layers disposed in repeated sequence in the stack, wherein the first layer comprises silicon dioxide, the second layer comprise zinc oxide, the third layer comprises aluminium nitride, and the fourth layer comprises zinc oxide.

19. The device of claim 1, wherein the stack comprises a third layer a fourth layer, a fifth layer, and a sixth layer, the first, second, third, fourth, fifth, and sixth layers disposed in repeated sequence in the stack, wherein the first layer comprises silicon dioxide, the second layer comprise zinc oxide, the third layer comprises aluminium nitride, the fourth layer comprises gallium nitride, the fifth layer comprises aluminium nitride, and the sixth layer comprises zinc oxide.

20. The device of claim 1, wherein the photoluminescent structures are quantum structures.

21. The device according to claim 1, wherein the photoluminescent material and the non photoluminescent material are made with a stack of layers with layers having the same composition, and wherein the quantum structures present within the non photoluminescent stack have relatively diminished photoluminescent characteristics compared to the quantum structures present within the photoluminescent stack.

* * * * *